May 28, 1957  R. E. YAEGER  2,793,807
PULSE CODE RESOLUTION
Filed Oct. 18, 1952  6 Sheets-Sheet 1

INVENTOR
R. E. YAEGER
BY
ATTORNEY

May 28, 1957  R. E. YAEGER  2,793,807
PULSE CODE RESOLUTION
Filed Oct. 18, 1952  6 Sheets-Sheet 2
FIG. 4
FIG. 5
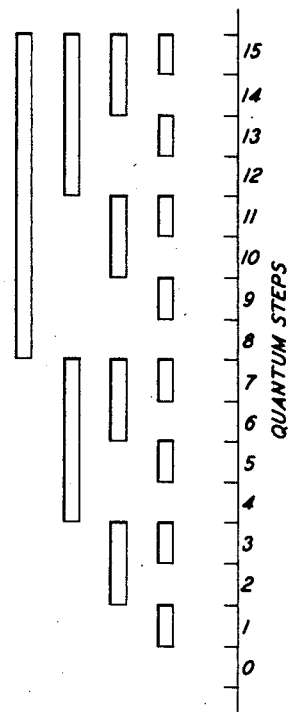
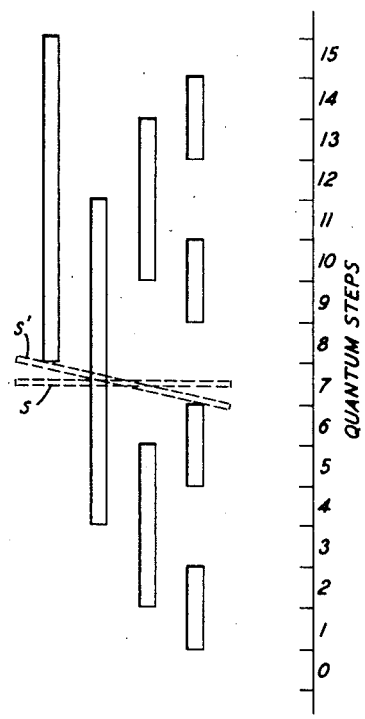
FIG. 6
FIG. 7
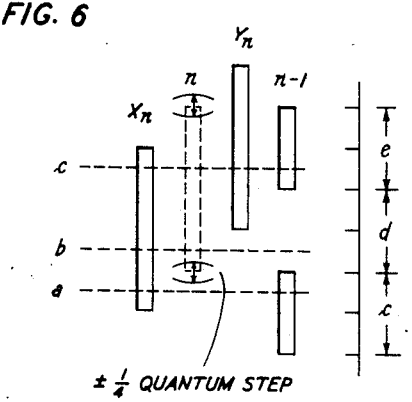
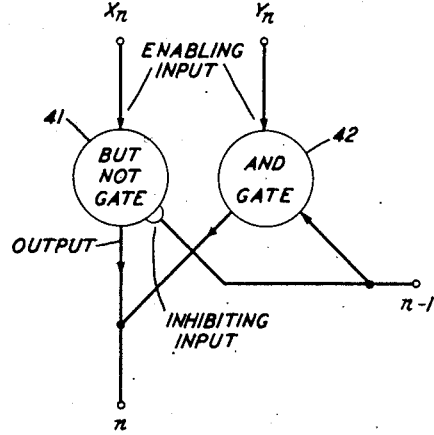
INVENTOR
R. E. YAEGER
BY
H. A. Burgess
ATTORNEY May 28, 1957 R. E. YAEGER 2,793,807
PULSE CODE RESOLUTION
Filed Oct. 18, 1952 6 Sheets-Sheet 3

INVENTOR
R. E. YAEGER
BY
ATTORNEY

May 28, 1957  R. E. YAEGER  2,793,807
PULSE CODE RESOLUTION
Filed Oct. 18, 1952  6 Sheets-Sheet 4

INVENTOR
R. E. YAEGER
BY
ATTORNEY

May 28, 1957 R. E. YAEGER 2,793,807
PULSE CODE RESOLUTION
Filed Oct. 18, 1952 6 Sheets-Sheet 5

INVENTOR
R. E. YAEGER
BY
ATTORNEY

May 28, 1957     R. E. YAEGER     2,793,807
PULSE CODE RESOLUTION

Filed Oct. 18, 1952     6 Sheets-Sheet 6

INVENTOR
R. E. YAEGER
BY
ATTORNEY

United States Patent Office 2,793,807
Patented May 28, 1957

2,793,807
PULSE CODE RESOLUTION

Robert E. Yaeger, Bedminster, N. J., assignor to Bell Telephone Laboratories, Incorporated, New York, N. Y., a corporation of New York Application October 18, 1952, Serial No. 315,449

13 Claims. (Cl. 235—61)

This invention relates to the conversion of intelligence which may be continuously variable into digital information and more particularly with pulse code resolution. By way of definition, "pulse code resolution" is the determination of a code group of pulses representative of a given sample of intelligence.

It is an object of the invention to improve the resolution accuracy in pulse encoding apparatus.

It is also an object of the invention to relax the tolerance requirements, both optical and mechanical, in pulse encoding apparatus and more particularly without impairing the resolution accuracy.

Another object of the invention is to accurately resolve a digit in an $n$ digit pulse code within $\pm 1/m$ quantum steps with encoding tolerances substantially greater than $\pm 1/m$ quantum steps.

Stated in other words, it is an object of the invention to determine accurately the code group representative of a signal sample from readings which have a relatively low degree of accuracy.

The illustrative embodiments of the invention, described in more detail below, are concerned primarily with the reduction of errors in the coding process. They should therefore be distinguished from error correcting systems, such as described in Patent 2,552,629 to R. W. Hamming and B. D. Holbrook, dated May 15, 1951, and in Patent 2,596,199 to W. R. Bennett, dated May 13, 1952, which detect, locate, and correct errors occurring in transmission.

In accordance with a specific illustrative embodiment described in more detail below, unquantized or analog information is represented by the angular position of a rotatable shaft. A code wheel inscribed with the binary code is mounted on the shaft; On functions are represented by slots in the wheel. Light flashed through the code slots is read along a radius of the wheel by photocells, one for each digit of the code. The outputs of the photocells in the form of On or Off pulses represent, in binary form, the angular position of the shaft. This digital information is then stored in a register where it awaits further operations, for example, translation, addition, transmission, etc.

One place where errors are likely to arise in the coding process is at the transition of a digit from Off to On, or vice versa; such errors are known as transitional errors. Transitional errors may arise from mechanical misalignment, poor definition of the scanning beam, etc. The conventional binary code is particularly susceptible to transitional errors, since as many as $n$ digits in an $n$ digit code may undergo a transition at a given quantum step boundary. Further, a single transitional error may result in an error in the decoded signal of many quantum steps. For example, the conventional four-digit binary code group for the digit 7 is 0111, while the code group for the digit 8 is 1000, representing a transition in all four digits. If a signal of quantum value 7 is to be encoded, a slight misalignment in the scanning process may result in a reading of 1111 which represents the digit 15 or an error in the decoded signal of 8 quantum steps.

The foregoing has been more fully discussed in a copending application of F. Gray, Serial No. 785,697, filed November 13, 1947, which issued as Patent No. 2,632,058 dated March 17, 1953. The Gray patent demonstrates benefits obtainable from a unique property of the so-called reflected binary code; viz., since at each quantum step boundary only one digit undergoes a transition, a transitional error in reading this digit will result in a decoded signal error of not more than one quantum step. For example, the reflected binary code group for digit 7 is 0100; for digit 8, 1100, a change or transition in only the most significant digit. Therefore, even if there is a transitional error in reading digit 7, which could occur only in the most significant digit, the net error will be not more than one quantum step in the decoded signal. In summary, transitional errors may be limited to plus-or-minus one quantum step by the use of the reflected binary code.

If it is desired to resolve each digit with an accuracy of less than one-half quantum step, the tolerance on all digits will have to be held to less than plus-or-minus a one-quarter quantum step even though the reflected code is used. For the more significant digits, this represents a very small tolerance percentagewise. This small tolerance requires accurate location of the ends of the digit slots even though they be long slots, accurate alignment, and requires high definition in the scanning beam. In accordance with the present invention, these tolerances are greatly relaxed by employing the conventional binary code and by substituting for the normal bivalued function which defines each digit two functions designated X and Y. These substituted functions, together with a previously resolved digit, viz., the digit of next lower significance, define by logical relations the desired digit. Due to the nature of these logical relations, the tolerances in determining the substituted functions can be substantially greater than would be the tolerances if the digits were resolved directly, without decreasing the resolution accuracy. The digits are resolved by logically comparing the X and Y determinations with the resolved digits of next lower significance. The comparison of the X function with the next lower digit is a But Not comparison, and the comparison of the Y function with the next lower digit is an And comparison. These comparisons are made in order of increasing significance.

A feature of the invention is that the transition tolerances increase rapidly as the digit significance increases, although the resolution accuracy is unimpaired. The slots representing the more significant digits may therefore be located and scanned with a relatively low degree of accuracy without any sacrifice in the degree of resolution. Encoding apparatus employing principles of the present invention is, therefore, superior in this respect to apparatus employing the reflected binary code and has the additional feature that translation apparatus for translating from the reflected to the conventional binary code is unnecessary. (The reflected code is normally translated into conventional code prior to being decoded, since the decoding operation with the reflected binary code is relatively cumbersome.)

These and other features and objects of the invention may be better understood from a consideration of the following detailed description when read in accordance with the attached drawings, in which:

Fig. 4 is a plan view of the slots in a rectangular coding mask inscribed with the conventional binary code;

Fig. 5 is a similar view of a coding mask inscribed with the reflected binary code;

Fig. 6 illustrates location of the slots in a rectangular coding mask embodying principles of the invention;

Fig. 7 is a schematic illustration of a logic circuit for resolving a binary code digit in accordance with principles of the invention;

Figure 12:
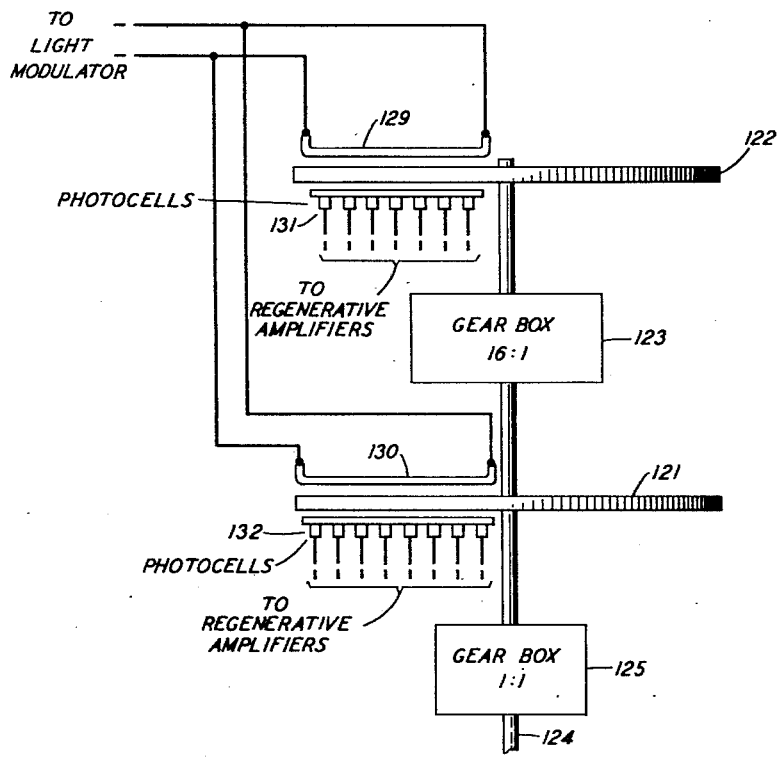
Figure 13:
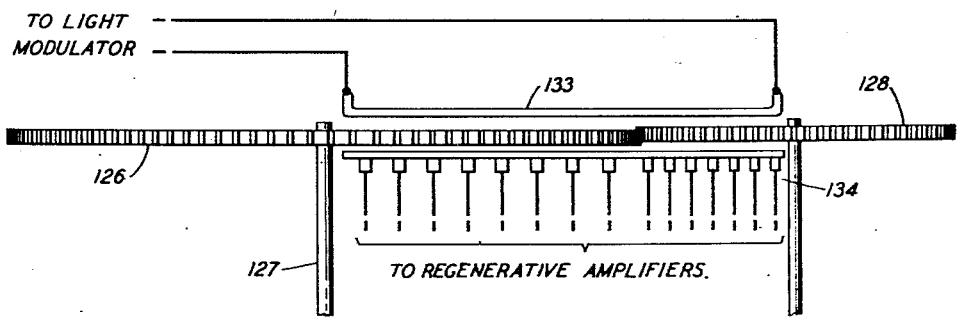
Figure 14:
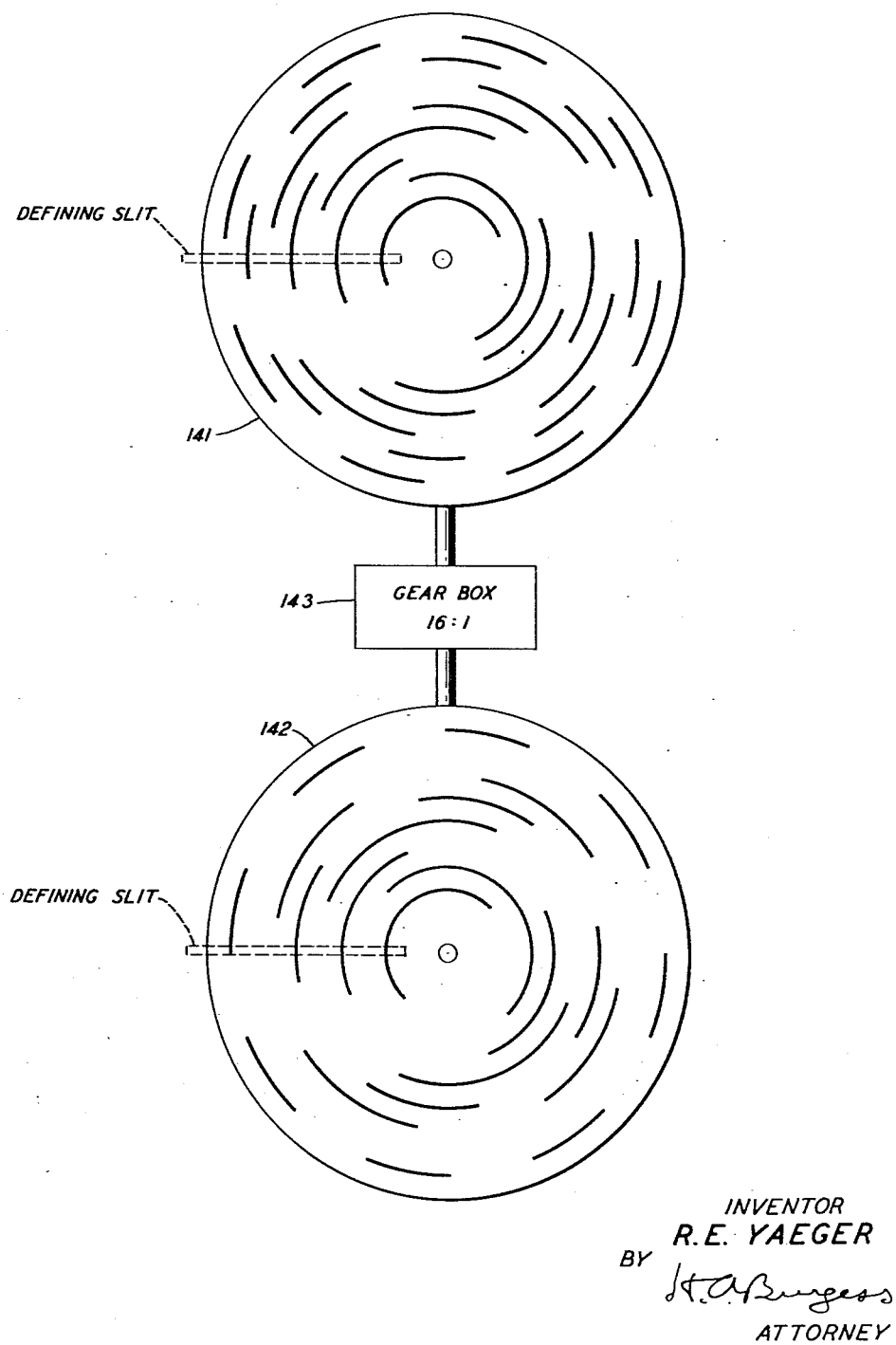

Figs. 12, 13, and 14 illustrate, pictorially, alternative embodiments of the invention wherein the code is inscribed on two code wheels rotating at different rates.

Figure 1:
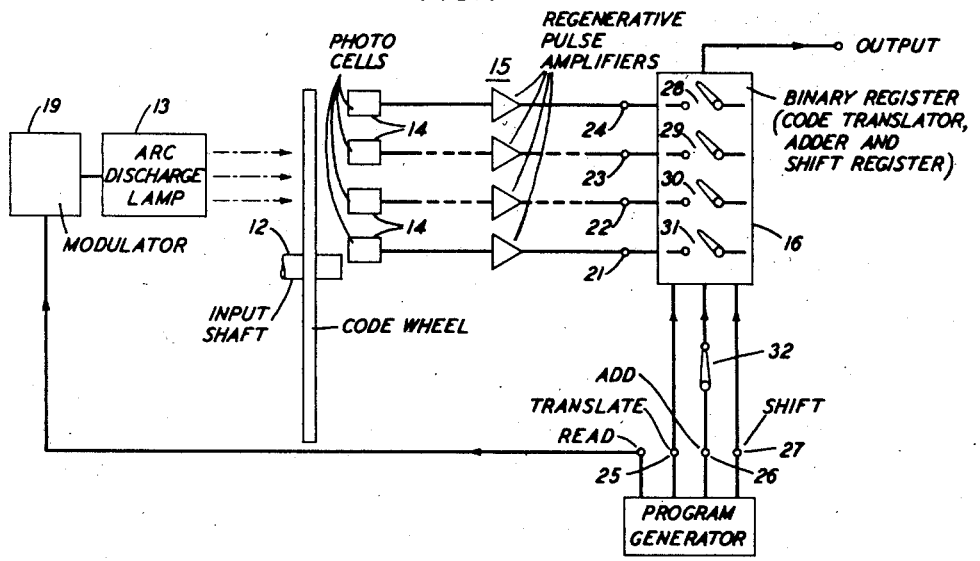
Fig. 1 illustrates, partially pictorially and partially schematically, an optical angular position encoder.
Figure 2:
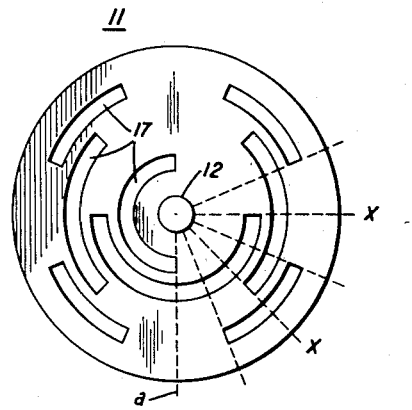
Fig. 2 is a plan view of a code wheel which may be employed in the encoder illustrated in Fig. 1.
Figure 3:
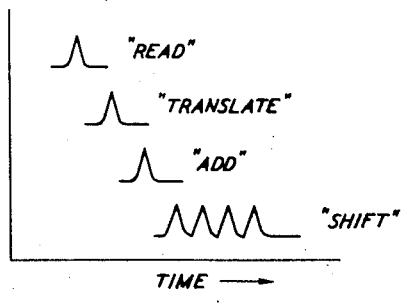
Fig. 3 is a timing diagram illustrative of Fig. 1.

Figs. 1 through 3 illustrate apparatus of the type to which principles of the invention are applicable. This apparatus is described in more detail in my copending application Serial No. 255,823, filed November 10, 1951, which issued on August 14, 1956, as Patent 2,758,788. The general purpose of this apparatus is to translate the angular position of a rotatable shaft into a digital code; it is, therefore, an analog-to-digital translator. A code wheel 11 is rigidly mounted on the shaft 12. Light from a source 13 is passed through slots in the wheel to a group of photocells 14, each cell representing a digit of information. The current pulses delivered by the photocells, when energized, are amplified by regenerative pulse amplifiers 15 and are fed into a binary register 16 which performs the function of code translation, serial addition (if desired), and digit shifting.

A plan view of the code wheel 11 is shown in Fig. 2. Each digit is represented by a concentric ring pattern of slots 17 in the wheel. The slots could alternatively be transparent sections of an otherwise opaque glass plate; photographic-etching techniques are applicable to the forming of such openings where they are extremely small. The significance of the digit positions decreases outwardly from the shaft 12 so that the innermost slot represents the most significant digit and the outermost slot represents the least significant digit. The digit slots are arranged so that the slots representing the least significant digit and including the smaller angles fall on the concentric circles of larger radius. This enhances the accuracy with which the wheel may be fabricated in an obvious manner.

The digits are "read" along a fixed radius. As the code wheel rotates with the shaft, the combinations of digits at a fixed radial line change. With a four-digit code, as shown in Fig. 2, there will be 2⁴ or 16 changes for one 360-degree revolution of the wheel. This means that the encoder can discriminate 16 quantum steps or angular positions. With more digits, smaller quantum steps can be recognized.

The magnitude of the quantum steps on the four-digit code wheel shown in Fig. 2 is illustrated by the dotted radial lines which indicate several successive radii at which the code changes. Were the conventional binary code used instead of the reflected code, there would be a problem of ambiguity from one quantum step to the next. For example, at the dotted line $a$, the reflected code changes from 0100 to 1100, the wheel rotating counterclockwise under the dotted line, a change of but a single digit and representing a change decimally from 7 to 8. The conventional binary code groups for these numbers are 0111 and 1000, a change of all four digits. The reflected code is, therefore, preferable for this type of encoding, since there is never a change of more than one digit between adjacent quanta, regardless of the number of digits in the code. Ambiguity errors are therefore limited to one quantum step.

The light source 13 is a high intensity arc discharge lamp which supplies a short but intense pulse of light when triggered. The SA309 manufactured by the Sylvania Electric Products, Incorporated, is suitable for this purpose. Further, this lamp has a long filament which is mounted parallel to a radius of the wheel. A "read" pulse applied to the modulator 19 triggers the light source 13 and, instantaneously, optically samples the reflected binary code digits on the radius illuminated by the light. A radial defining slit may be mounted between the photocells and the code wheel to reduce ambiguity errors which may result from the lamp illuminating an angular area spanning two discrete angular quanta.

The photocells 14 may, for example, comprise light-sensitive $p-n$ junction diodes of the type described in R. S. Ohl Patent 2,402,662, dated June 25, 1946. One photocell is provided for each digit of the code, and each cell is mounted by means not indicated to respond only to light shining through the slots of one of the concentric rings. In other words, there is a photocell for each order of significance, and the output of each photocell represents one digit of information.

The current pulses produced by the photocells will normally be low energy pulses so that some amplification may be required. Since the information is fairly simple in nature, i. e., either Yes or No, simple regeneration may be employed rather than linear amplification. The regenerative amplifiers 15 are, therefore, essentially monostable multivibrators which deliver an output pulse of the desired energy when triggered by a current pulse from their associated photocell. The amplifiers 15 may therefore comprise monostable gas tube, vacuum tube, or transistor circuits, the latter as described, for example, in a copending application of A. E. Anderson, Serial No. 166,733, filed June 7, 1950, which issued on May 17, 1955, as Patent 2,708,720, and also in my Patent 2,758,788 mentioned above.

Each time a "read" pulse triggers the light source 13, a parallel group of regenerated pulses will appear at the input terminals 21—24 of the binary register. Each group of pulses is the reflected binary code number representing the angular position of the shaft 12, a pulse representing a "1" and the absence of a pulse a "0." Each group of pulses is stored in parallel form in the binary register 16 until a translate pulse is applied by the program generator to control terminal 25. The registered number will, upon the application of a translate pulse, be translated into parallel conventional binary code. The translated number will then be stored until an add pulse is applied to control terminal 26. The add pulse will convert the number stored in the register to the sum of the translated number and another number represented by the position of switches 28—31, a switch being closed to represent a "1" and left open to represent a "0." This latter number may be a fixed correction factor, accounting, for example, for known discrepancies in the coding process or for some fixed deviation in the angular position of the input shaft. The number representing the sum may be "read out" either in parallel or in series. In the illustrative embodiment, the registered number is "read out" in series with the least significant digit first upon the application of a series of shift pulses, one for each digit, to control terminal 27. The register will be cleared to receive the next group of digits when the last digit of the preceding number is read out.

The pulse timing diagram in Fig. 3 illustrates the sequence of operations by showing the relative timing of the control pulses delivered by the program generator.

It may be noted that the overall system shown in Fig. 1 translates an analog representation into a digital representation in parallel reflected binary code, which is, in turn, translated into conventional parallel binary code, which is, in turn, translated into sequential conventional binary code. Further, the number read out may include a fixed correction factor, although, by omitting the add pulse, for example, by opening the switch 32, this operation may be omitted. The code translation addition and digit shifting apparatus is described in detail in my above-mentioned application. Since a more complete understanding of this apparatus is not necessary for an understanding of the invention, it will not be described further; for present purposes, it will be sufficient that the box 16 be considered solely as a binary register which receives and stores the binary code as read.

A problem with which the invention is concerned is the accurate resolution of the binary number read by the code wheel 11 and associated optical and electrical apparatus. Resolution is largely a question of distinguishing one particular number or digit from adjacent numbers or digits. Therefore, the problem is more pronounced as more digits are added to the code since it becomes more difficult to inscribe, accurately, the increasingly shorter slots.

A comparison of the conventional and reflected binary code may be made by referring to the code patterns illustrated in Figs. 4 and 5. The code pattern in Fig. 4 illustrates the conventional binary code, that of Fig. 5 the reflected binary code. These figures illustrate the code patterns in a form usable in coding tubes in pulse code modulation systems wherein the On functions of each digit are represented by slots in a coding mask; see, for example, an article by L. A. Meacham and E. Peterson entitled "An Experimental Multichannel Pulse Code Modulation System of Toll Quality," which appears in the Bell System Technical Journal for January 1948. The most significant digit appears at the left of each code pattern, the significance decreasing to the right. The code pattern illustrated in Fig. 5 is the same as the one inscribed on the code wheel shown in Fig. 2 except that the digit slots appear in parallel columns instead of concentric circles. In one type of pulse code modulation system, an electron beam is first deflected vertically by an amount proportional to the amplitude of the signal sample. The magnitude of the vertical deflection is then "read" horizontally, either by a thin broad ribbon beam, which illuminates the width of the coding mark, or by a pencil-like beam which is deflected horizontally across the mask. A suitable anode or anodes located back of the mask delivers a pulse or not for each digit, depending on whether or not the beam passes through a slot at the quantum level at which the reading is made. A four-digit code is capable of recognizing $2^4$ or 16 discrete quantum steps; these steps are indicated by the scales at the right of Figs. 4 and 5.

It is characteristic of both the conventional and reflected binary codes that the transitions between all digits have to be resolved to less than ½ quantum step if every quantum step is to be recognized. This is illustrated on the four-digit reflected code pattern illustrated in Fig. 5. Quantum step 7 is the interval between the transition of the least significant digit from "1" to "0" and the transition of the most significant digit from "0" to "1," i. e., between 0101 and 1100. If the On or "1" condition of either or both of these digits undergoing transition should be lengthened ½ quantum step, step 7 could never be resolved. In other cases, the shortening of the digits would produce the same effect. It is for this reason that each digit must be resolved to less than ½ quantum step in order to count every quantum step. These deviations of the On condition can be caused partly by the impossibility of attaining an instantaneous change from fully Off to fully On due to the finite width of the scanning slit or beam and partly by other optical and electrical limitations such as parallax discrimination. Added to these departures from perfection are the possible tilt or misalignment of the scanning slit or beam and errors in the inscription of the code pattern. For example, the correct alignment of the scanning slit, or trajectory of the scanning beam, is illustrated by $s$ in Fig. 5. A slight tilt to $s'$, however, makes quantum step 7 unrecognizable. It should be noted that the transition of all digits including the most significant digit must be held to an accuracy of less than ½ quantum step. In this respect, the reflected code is no better than the conventional code. If at least ½ of every quantum step is to be counted, this accuracy should be better than plus-or-minus ¼ quantum step. These accuracy requirements seem to be characteristic of all bivalued codes. In accordance with principles of the invention, however, the tolerances for inscribing and reading the more significant digits of a code can be greatly relaxed.

In Fig. 6, the dotted slot under $n$ and the slots under $n-1$ represent the most and next most significant digits, respectively, of a binary code following the conventional pattern. The slot $n$ is half as long as the total analog displacement to be quantized and coded; the $n-1$ slots are half as long as the slot $n$. The magnitude of plus-or-minus ¼ quantum step is indicated at either end of slot $n$. The number of digits and the correlated number of quantum steps are not shown, as this is unimportant to the preliminary discussion. Ignoring for the present the slots $X_n$ and $Y_n$, it would be necessary in order to resolve the digit $n$ within a half quantum step to hold the tolerances mechanical, optical, and electrical within these ranges of plus-or-minus ¼ quantum step.

In accordance with principles of the invention, instead of resolving the $n$th digit by a highly accurate single reading, the $n$th digit On function, i. e., the slot, is replaced by two functions designated $X_n$ and $Y_n$. These functions each include a portion of the function they represent and extend beyond it in opposite directions. The slot $X_n$ extends from substantially the center of the upper $n-1$ slot to approximately the center of the lower $n-1$ slot. The $Y_n$ slot extends from substantially the center of the space between the $n-1$ slots to a point a corresponding distance above the upper $n-1$ slot. As will be seen, however, the ends of the X and Y slots need be located only approximately and not with the high degree of accuracy which would be required if a single slot $n$ were employed.

Assume now that the digit of next lower significance $(n-1)$ is inscribed and read to an accuracy better than plus-or-minus ¼ quantum step. The $n$th digit will then be determined to within plus-or-minus ¼ quantum step if the digit $n-1$ and the character of the X and Y functions are applied as On or Off pulses to the combination of gates illustrated in Fig. 7. The But Not gate 41 has an enabling input, an inhibiting input, and an output and will produce an output if a signal, e. g., a pulse, is applied to the enabling input but not if a pulse is coincidentally applied to the inhibiting input. The And gate 42 has two enabling inputs and produces an output only upon a coincidence of inputs. Gates of these types are illustrated in a copending application of L. W. Hussey, Serial No. 198,688, filed December 1, 1950 which issued as Patent No. 2,636,133 on April 21, 1953.

These gates synthesize the logical relation between $X_n$, $Y_n$, $n-1$, and $n$. This logical relation arises from the manner in which X and Y are defined and may be stated as follows:

(1) If $X_n$ is a "1," $n$ will be a "1" But Not if $n-1$ is also a "1";

(2) If Y is a "1" And $n-1$ is also a "1," $n$ will be a "1";

(3) Under all other conditions, $n$ will be "0."

By way of illustration, first assume a reading to be made along the dotted line $a$ in Fig. 6; the digit $n-1$ is a "1," $Y_n$ is "0," and $X_n$ is "1." Pulses will therefore be applied to terminals $n-1$ and $X_n$, and no pulse will be applied to terminal $Y_n$. Terminal $X_n$ is connected to an enabling input of the But Not gate 41, and terminal $n-1$ is connected to an inhibiting input; the pulse applied to the $n-1$ terminal will therefore inhibit the But Not gate so that it can deliver no output. Terminal $Y_n$ is connected to an enabling input of the And gate 42, as is also the terminal $n-1$. The And gate requires two coincident inputs so that this gate will likewise produce no output so that the $n$th digit is resolved as a "0," neither gate producing an output. If a reading is made along the dotted line $b$ in Fig. 6, $n-1$ will be "0," $Y_n$ will be "0," and $X_n$ will be "1." Under these conditions, the And gate in Fig. 7 will produce no output, but the But Not gate will produce a "1," thus resolving the $n$th digit as a "1." Similarly, a reading along the dotted line $c$ in Fig. 6 will result in no output from the But Not gate but an output from the And gate, thereby resolving the $n$th digit as a "1."

The nature of the resolution process may be understood by examining the relation of the $n-1$ On functions with the $n$ function, the latter as represented by the dotted slot $n$ in Fig. 6. Over the quantum range $c$, $n-1=1$ and $n=0$. Over the quantum range $d$, $n-1=0$ and $n=1$. The digit $n$ may therefore be accurately resolved over the total range $c+d$ by the function X which includes and extends beyond the range $d$ if $n-1$ is allowed to inhibit X when $n-1=1$. This defines a But Not situation; $n=1$ if $X=1$ "but not" if $n-1=1$ and the gate 41 in Fig. 7 performs this function. The transitions of $X=1$ to $X=0$ are, therefore, relatively unimportant in view of the inhibiting effect of $n-1$ when equal to "1," so long as the function $X=1$ includes the range of $n$ where $n-1=0$, i. e., the range $d$. Over the quantum range $e$, $n-1=1$ and $n=1$. The digit $n$ may therefore be accurately resolved over this range by the function Y which includes and extends beyond the range if a coincidence of $n-1=1$ and $Y=1$ is required for $n=1$. This defines an And situation; $n=1$ if $n-1=1$ "and" if $Y=1$; the gate 42 in Fig. 7 performs this function. Also, the transitions of $Y=1$ to $Y=0$ become relatively unimportant so long as Y includes the range of $n$ where $n-1=1$.

The $X_n$ and $Y_n$ transitions must, of course, be held within certain limits and generally within a range equal to the interval spanned by a single $(n-1)$ On function, for example, an interval equal to the range $c$.

The code pattern illustrated by $n$ and $(n-1)$ in Fig. 6 is repeated throughout the conventional binary code; refer, for example, to Fig. 4. The principles just described are, therefore, applicable to an $n$ digit code generally. Each digit is necessarily resolved in turn in order of increasing significance, since the resolution involves comparison with the digit of next lower significance; the least significant digit is resolved directly from a single On-Off function.

Since the tolerances are in general determined by the interval spanned by a single On function of the digit of next lower significance, the tolerances increase rapidly as the order $n$ of the digit increases, as shown by the relationship:

Actual Transition Tolerance $=\pm(2^{n-2}-t)$ quantum step where $t$ is the net effective transitional tolerance.

The least significant digit $n=0$ has transitional tolerances of plus-or-minus ¼ quantum step. The X and Y transition tolerances of $n=1$ are plus-or-minus (1/2¼) or also plus-or-minus ¼ quantum step. For $n=2$, these tolerances are plus-or-minus (1¼) or plus-or-minus ¾ quantum step. For $n=3$, 1¾; for $n=4$, 3¾; for $n=5$, 7¾; for $n=6$, 15¾, etc. For a 15-digit code, the tolerance of the X and Y functions is 8512 quantum steps, indicating the rate with which the tolerance in terms of quantum steps increases.

Figure 8:
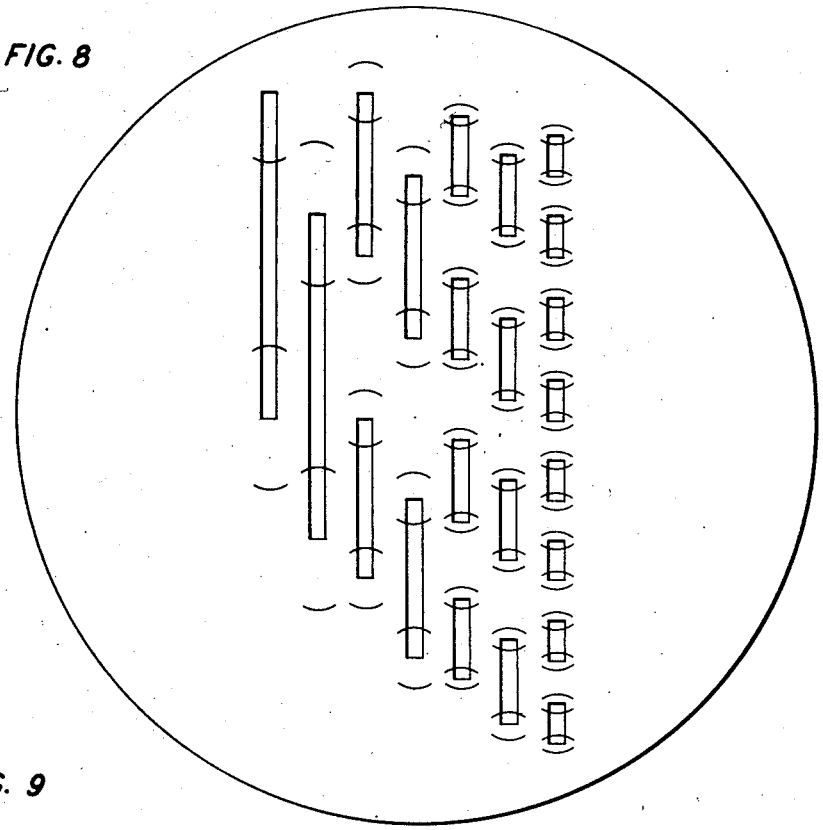
Fig. 8 is a plan view of a coding mask inscribed with a four-digit binary code in accordance with principles of the invention.

Fig. 8 illustrates a coding mask which could, for example, be employed in a pulse code modulation encoding tube, inscribed with a four-digit binary code in accordance with principles of the invention. The transition tolerance limits for each of the digits for $t=\frac{1}{4}$ are indicated by the brackets around the end of each digital slot. As just mentioned, the least significant digit has a direct On-Off two-function state. Since the tolerances on the more significant digits are greatly relaxed, it is possible to read these digits by simpler means such as simple diode On-Off circuits rather than the means required to read those digits having relatively small tolerances. Further, this may be accomplished without losing the coordination between the digits which gives rise to the logical relations which define the desired digits in terms of redundant information. The relaxed tolerances also reduce the requirement of scanning beam linearity, permitting it to wander without losing accuracy of resolution.

Figure 9:
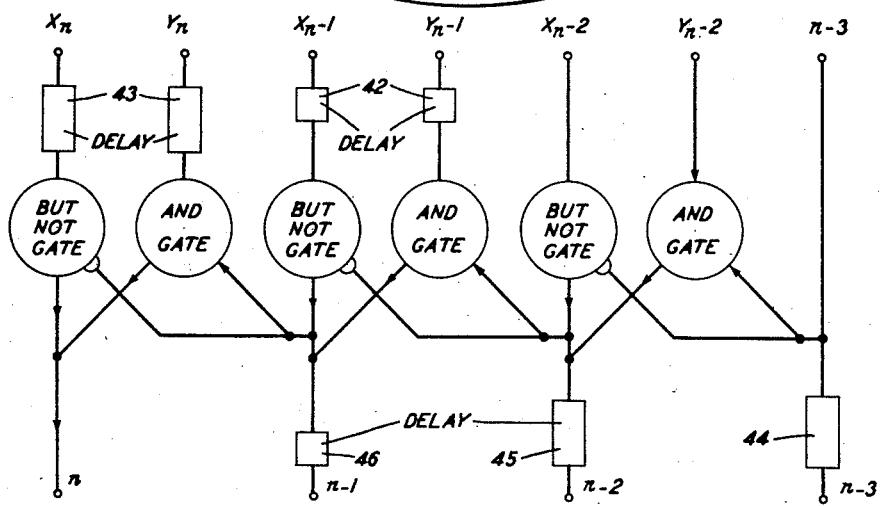
Fig. 9 is a schematic diagram of a logic circuit for resolving the code groups "read" with the coding mask of Fig. 8.

Fig. 9 illustrates a circuit which will resolve the four-digit code read by the mask shown in Fig. 8. These gates are similar to those shown in Fig. 7. Assuming the character of the various digital functions to appear simultaneously at the input terminals labelled $X_n$, $Y_n$, etc., the translation process begins with the least significant digit by virtue of the delays 42—46 which are proportioned as indicated in the drawing. The resolved four-digit binary code will then appear simultaneously at the output terminals $n$, $n-1$, $n-2$, and $n-3$.

A principal feature of the invention is that little construction or alignment accuracy is required for the more significant digits. This is of particular importance where a code wheel is employed and the more significant digits are located closer to the center of the wheel and hence on circles of smaller circumference. A defining slit may be necessary only for the first few of the least significant digits in order to hold their resolution accuracy to plus-or-minus ¼ quantum step. It may be possible to read the remaining digits directly by photocells without the need of a highly defined optical system. These advantages, particularly where a code of many digits is employed, greatly outweight the disadvantage of requiring almost twice the number of photocells 14 and output amplifiers 16 shown in Fig. 1. Although the increase in the number of photocells would increase the radius occupied by the code, it would not require an increase in the diameter of the code wheel as the more significant digits can be brought very close to the center. In fact, the overall diameter may even be decreased.

Another important feature of the invention is that the reading is resolved in the conventional binary code so that translation, as indicated in Fig. 1, is not necessary.

Figure 10:
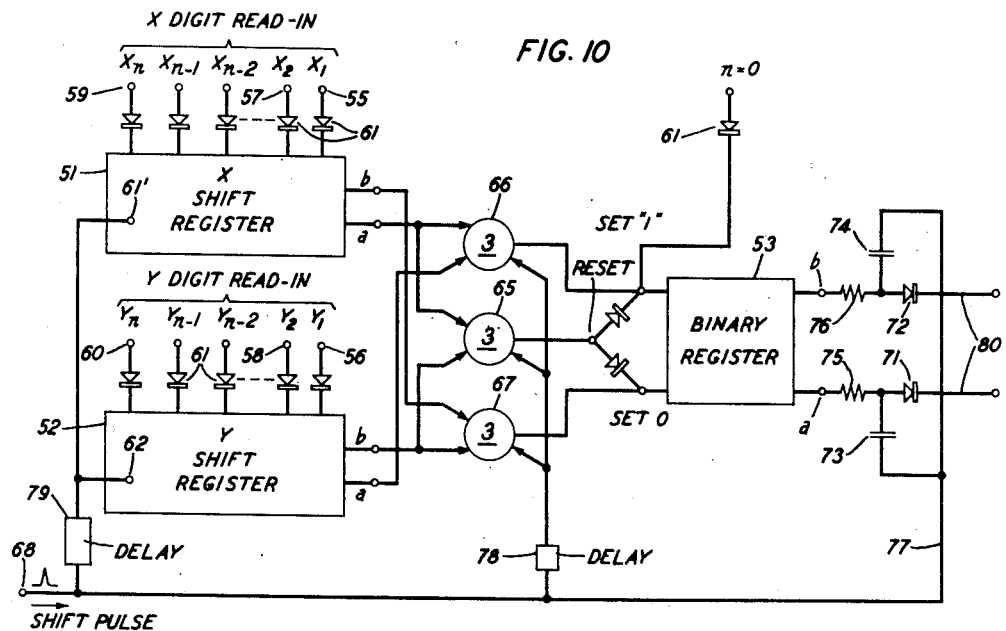
Fig. 10 illustrates schematically a program controlled pulse code resolution circuit embodying principles of the invention.

The circuit in Fig. 10 illustrates a practical way of resolving the X and Y information into the desired code. This circuit affords an economy in the gates required and does not require simultaneous reading of the X and Y information. It is a program controlled system and may be readily adapted into a system such as is illustrated in Fig. 1.

At the beginning of each program cycle, X and Y information in the form of On or Off pulses is read into the X and Y shift registers 51 and 52, respectively. The least significant digit, which requires no further resolution, is read directly into the binary register 53. In terms of Fig. 1, a "read" pulse triggers the modulator 19 and and lamp 13 and the photocells 14 are energized or not depending on the character of the digit information along the reading radius. In physical terms, only those cells positioned behind a slot along the reading radius or behind the defining slit, if one is used, will be energized. The output of the photocell which reads the least significant digit, $n=0$, is applied to the terminal 54. The outputs of the photocells which read the X and Y information of the digit of next higher significance, $n=1$, are applied to terminals 55 and 56, respectively, that of the next digit to terminals 57 and 58, etc.; the X and Y information of the most significant digit is applied to terminals 59 and 60. The X and Y subscripts in the figure refer to the order of significance where $n$ is the highest order of significance and $n=0$ is the least significant digit. The information is applied to the registers through isolating diodes 61.

The register 53 is a device capable of storing one bit of binary information and may, for example, comprise a bistable multivibrator of the Eccles-Jordan type. The character of the information stored by the register is represented by the potentials at two output terminals $a$ and $b$ which alternate out of phase between two values as the character of the information stored changes. If the more positive of these potentials is arbitrarily designated "1" and the more negative "0," whether or not both potentials are actually positive, both are negative, or one is positive and one negative, one terminal, $a$ or $b$, will register a "1" and the other a "0." Terminal $a$ is arbitrarily chosen as indicating the character of the binary digit being stored.

The register 53 has three input terminals, "set 1," "set 0," and "reset," their designations connoting their functions. For example, a pulse applied to the "set 1" terminal will set the register in its state characterized by a "1" at terminal $a$ and a "0" at terminal $b$, a pulse applied to the "set 0" terminal will set the register in the state characerized by a "0" at terminal $a$ and a "1" at terminal $b$, and a pulse applied to the reset terminal will cause the register to reverse its state, in whatever state it may have been.

The X and Y shift registers 51 and 52 are devices for storing bits of binary information in parallel form which can then be shifted from left to right upon the application of shift pulses to terminals 61' and 62 so that each bit in turn appears at terminal $a$ as a "1" or a "0," depending on its character. A simple form of shift register is described in an article entitled, "Digital Computers for Scientific Applications," by West and DeTurk, which appears in the Proceedings of the IRE for December 1948. These registers may, for example, comprise a plurality of binary registers similar to the register 53, one for each bit of information to be stored, connected in tandem. The shift pulse may, for example, set each register to "0." Each stage of the register which was previously set to "1" will, in going to "0," transmit a pulse to the succeeding stage and set it to "1," thus passing the information from left to right until the register is cleared. A shift register employing transistors is described in detail in my copending application mentioned above. The potential at the $a$ terminal of each register indicates the character of the digit in the final stage of the register and the $b$ terminal its logical negative.

The threshold 3 gates 65, 66, and 67 simulate the But Not and And comparisons previously described. The "3" indicates the threshold number of enabling inputs necessary for the gate to be completely enabled and deliver an output. These gates may, for example, comprise diode gates of the type described in W. D. Lewis Patent 2,535,303, dated December 26, 1950. The nature of the functions they perform is illustrated by the following table which sets forth the possible $n'$, X, and Y conditions which can exist and the resulting digit $n'+1$ which will result from each:

| $n'$ | X | Y | $(n'+1)$ |
|---|---|---|---|
| 0 | 0 | 0 | 0 |
| 0 | 0 | 1 | 0 |
| 0 | 1 | 0 | 1 |
| 0 | 1 | 1 | 1 |
| 1 | 0 | 0 | 0 |
| 1 | 0 | 1 | 1 |
| 1 | 1 | 0 | 0 |
| 1 | 1 | 1 | 1 |

$n'$ is the digit just resolved and $n'+1$ is the digit of next higher significance to be resolved. In terms of Fig. 10, $n'$ is the present condition of the register 53 and $n'+1$ will be its condition after the resolution, the digit $n'$ having been read out. We may note the following conditions and results:

(1) When $X=1$ and $Y=0$, $n'+1$ is the logical negative of $n'$; under these conditions, the register 53 must be reset whether $n'$ was a "0" or a "1."

(2) When $X=1$ and $Y=1$, $n'+1$ will also be a "1"; under this condition, the register 53 must be set to "1" if it were registering a "0," and if it were registering a "1" it remains unchanged.

(3) When $X=0$ and $Y=0$, $n'+1$ will be a "0"; under this condition, the register 53 must be set to "0" if it were registering a "1," and if it were registering a "0" it remains unchanged.

(4) When $X=0$ and $Y=1$, $n'+1$ will be the same as $n'$; under this condition, it will be unnecessary to disturb the register 53.

The threshold 3 gates perform the functions just outlined. Each gate is adapted to produce an output if all three inputs are simultaneously enabled. One input of each gate is energized by the shift pulse which is initially applied to terminal 68. The remaining two inputs of each gate are connected to the $a$ or $b$ terminals of the X and Y registers 51 and 52. The latter inputs will be enabled by "1's" and will not respond to "0's." Since the register output voltages are direct or steady potentials, the shift pulse may be deemed the input of each gate which is transmitted only if the remaining two controls are both enabled.

The gate 65 performs the function outlined by (1) above. Its output is connected to the reset terminal of the register 53, and its two "control" terminals are connected to the $a$ terminal of the X register 51 and the $b$ terminal of the Y register 52. Since the $a$ terminal indicates the character of the digit being read and the $b$ terminal its logical negative, it may be seen that upon the application of a shift pulse to the gate 66, a pulse will be applied to the reset terminal of register 53 if $X=1$ and $Y=0$; this satisfies condition (1).

In a similar manner, the gate 66 will be enabled if $X=1$ and $Y=1$, the output of this gate when enabled being applied to the "set 1" input of the register 53. Register 53 will not be disturbed by this input if already set to "1." The gate 67 will be enabled if $X=0$ and $Y=0$ and when enabled apply a pulse to the "set 0" input of the register 53. These three gates, therefore, simulate the But Not and And comparisons performed by the gates shown in Fig. 9; only three gates are required regardless of the number of digits.

The output of the register 53 is read by means of the diodes 71 and 72, condensers 73 and 74, and resistors 75 and 76. The positive shift pulse is applied to both diodes over lead 77. If the register 53 is storing a "1," terminal $a$ will be more positive than terminal $b$ and, in fact, sufficiently positive so that the diode 71 will transmit the positive shift pulse. Terminal $b$ will be sufficiently negative so that the shift pulse will be blocked by the diode 72. If the register 53 is storing a "0," the shift pulse will be transmitted by the diode 72 and blocked by the diode 71. If a symmetrical signal is not required, the connection to the lower diode 72 may be omitted so that a pulse will be transmitted only if the register is storing a "1." The R. C. combination provided by the resistors 75 and 76 and condensers 73 and 74 gives the circuit memory so that even though the register 53 may be undergoing a state of change, the diodes will respond to the potentials determined by the previous state and will not be adversely affected by the transient conditions.

The operation cycle of the circuit is as follows. Information is first read into the registers 51, 52, and 53; the read-in need not be simultaneous. The shift pulse is then applied to the terminal 68. Noting the delays 78 and 79 which have been inserted primarily to facilitate understanding of the circuit, the shift pulse will first be applied to the diodes 71 and 72 over lead 77 and "read" the least significant digit which is standing in the register 53 and cause it to be transmitted as an On or Off pulse over the leads 80. After a delay determined by the delay 78, the shift pulse will be applied to the gates 65—67 which operate to resolve the digit of next higher significance standing in the form of X and Y information at the *a* and *b* terminals of the X and Y registers and store the resolved digit in the register 53. After a further delay determined by the delay 79, the X and Y information is shifted to the right so that the X and Y information for the digit just resolved is discarded and the X and Y information of the next digit to be resolved, namely, the digit of next higher significance, is shifted to the final stage of the registers 51 and 52 to appear at terminals *a* and *b*. The next succeeding shift pulse reads the digit just resolved, now stored in the register 53, resolves the digit of next higher significance, and stores it in the register 53 in place of the digit just transmitted and shifts the X and Y information another step to the right. Successive shift pulses are applied until all the digits have been resolved and transmitted, and the registers are clear. More information is then read into the registers and the operation is repeated.

A feature of the code resolution circuit just described is that the digits of the code number are transmitted in order of increasing significance with the least significant digit first. The resolved code may thus be readily applied to a serial adder or other device which characteristically operates on binary digits in order of increasing significance.

Figure 11:
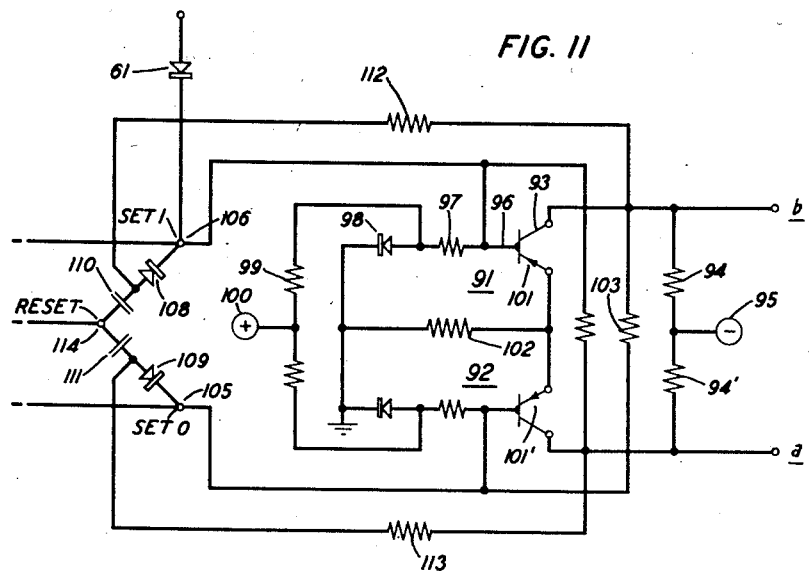
Fig. 11 is a schematic diagram of an illustrative binary register.

An illustrative binary register employing transistors which may be employed as the register 53 in Fig. 10 is illustrated in Fig. 11. Transistors, in several forms, are described, for example, in Patents 2,524,035 to J. Bardeen and W. H. Brattain, dated October 3, 1950, 2,569,347 to W. Shockley, dated October 25, 1951, and 2,502,488 to W. Shockley, dated April 4, 1950. The register illustrated in Fig. 11 is similar to one disclosed in an application of A. E. Anderson and R. L. Trent, Serial No. 246,833, filed September 15, 1951 which issued as Patent No. 2,622,212 dated December 16, 1952. The circuit is substantially symmetrical, employing two transistors 91 and 92 each connected as a trigger circuit. The collector circuit for the transistor 91 includes the collector 93, resistor 94, negative collector supply 95, and the base circuit, which comprises the base electrode 96 and the resistor 97 in series with the diode 98, the latter being in parallel with resistor 99 and the positive source of biasing potential 100. The sources 95 and 100 are grounded. The emitter circuit includes the emitter electrode 101, grounded resistor 102 which is common to both trigger circuits, and the base circuit just described. The resistor 99 is fairly large and provides sufficient regenerative feedback from the collector circuit to the emitter circuit for positive emitter current to give rise to a region of negative resistance in the emitter current versus emitter voltage characteristic of the circuit. For positive emitter currents, i. e., in the region of high collector currents, the diode 98 is biased in its high resistance condition and is effectively an open circuit so that in this region the effective base resistance is determined primarily by resistors 97 and 99. Resistor 97 is small relative to resistor 99. For negative emitter currents, the diode 98 effectively switches the resistor 99 out of the circuit by becoming a low resistance and thereby minimizes variations in the trigger point, as described in Patent 2,579,336 to A. J. Rack, dated December 18, 1951. Transistor 92 is connected in a similar trigger circuit.

The two trigger circuits are interconnected by the resistors 102 and 103 which cross-connect the collector and base electrodes of the two transistors and also by the common emitter resistor 102. Resistor 102 insures that once the circuit is initially triggered, one side will be On and one side Off, On referring to high collector current and Off to low collector current. In general, triggering is effected by turning the On side Off. As illustrated, the circuits are triggered on the base electrodes of the transistors; the triggering pulses are, therefore, positive pulses. Assuming the trigger circuit comprising transistor 91 to be On and the other trigger circuit to be Off, a positive trigger pulse applied to terminal 105, the Off side, would not disturb the circuit. A positive pulse applied to terminal 106, however, would tend to turn the On side Off by raising the base potential of the transistor 91. The same pulse would also be applied to the emitter 101' of the transistor 92 by virtue of the common emitter coupling, since the forward emitter resistance of the On unit is relatively low. This would tend to turn the Off unit On. The cross-connected resistors 102 and 103 would enhance these tendencies so that the register would rapidly reach a stable state wherein the trigger circuit comprising transistor 92 is On and the other trigger circuit Off.

Two output terminals *a* and *b* are provided. These terminals are connected to the collector electrodes of the transistors, and their potential is determined by the potential of the negaitve collector supply 95 and the current drop through either resistors 94 or 94'. When the upper trigger circuit is On and the lower trigger circuit Off, there will be substantially no current flow through resistor 94', and a heavy current flow through resistor 94 so that terminal 107 will be at a less negative potential, herein called positive, than terminal 108. These relative potentials will be reversed when the lower trigger circuit is On and the upper trigger circuit Off. The collector potential of the On unit, the positive potential, is arbitrarily chosen to represent a "1" and the other potential a "0." If output is taken as the steady voltage of output terminal *a*, the input terminal 106 becomes the "set to 1" terminal, since a positive trigger applied to this terminal causes output terminal *a* to assume the more positive of its two possible negative potentials, namely, a "1." Input terminal 106 is, therefore, the "set to 0" terminal.

The reset circuit comprises the diodes 108 and 109 and the condensers 110 and 111 and resistors 112 and 113. The diodes 109 and 109 are biased by the collector-to-base voltage of the transistor to which they are connected, which voltage appears across their respective resistors 112 and 113. The base electrode of the On unit is slightly more negative than the base electrode of the Off unit, while the collector electrode of the On unit is much less negative than the collector of the Off unit. The diode connected to the Off unit is therefore biased in the reverse direction by a substantially larger voltage than the diode connected to the On unit. A positive trigger pulse applied to terminal 114, the reset terminal, having an amplitude greater than the reverse biase of the On diode but less than the reverse bias of the Off diode, will be steered to the base electrode of the On unit and thus trigger the circuit into its other stable condition. The storage effect of the condensers 110 and 111 tends to keep the input or reset pulse correctly steered until the register has completely changed state.

Information is read into the register through the isolating diode 61. The register is initially set to zero, and if the incoming information is a "1," it will set the register to "1" and if a zero the register will remain undisturbed.

Several illustrative alternative embodiments are illustrated by Figs. 12, 13, and 14. These embodiments permit even greater relaxation of tolerance requirements.

The embodiments to be described employ two code wheels. In Fig. 12, the two wheels 121 and 122 are coupled by a 16:1 gear box 123, and the shaft 124, whose angular position represents the desired information, is coupled to the wheel 121 in a 1:1 ratio by the gear box 125. A one-degree displacement of the shaft 124, therefore, effects a one-degree displacement of the wheel 121 and a sixteen-degree displacement of the wheel 122. In Fig. 13, the first wheel 126 is mounted directly on the shaft 127 whose position is relevant and is directly coupled in a 16:1 ratio, by gears about its circumference, to the wheel 128. The manner of coupling the wheels is a matter of choice and will in general be governed by the particular application. The gear ratios mentioned are also illustrative but must be integral powers of two. Further, if $m$ is the power of two which represents the gear ratio, $m$ is also the number of digits which must be inscribed on the slower wheel; the remaining digits can be placed on the faster wheel. Therefore, the gear ratio for a particular application will depend on the total number of digits and the size of the wheels to be used. In some applications, no additional apparatus other than the additional code wheel will be required, the shafts and gearing apparatus being normally employed. In the embodiment of Fig. 12, two light sources 129 and 130, energized from a common modulator, are employed and the photocells are separated into two groups 131 and 132.

A common light source 133 and a single bank of photocells 134 are employed in the Fig. 13 embodiment. Since the code wheels 126 and 128 rotate in opposite directions, the codes on these wheels are inscribed in opposite manners, i. e., one reads clockwise, the other counterclockwise.

The advantage of employing two code wheels may be understood by referring to Fig. 14 which shows a plan view of two code wheels 141 and 142 inscribed with an 8-digit conventional binary code having the redundant information in accordance with the invention as described above and coupled by a gear box 143 having a 16:1 ratio. The wheel 141 is the slower wheel and has inscribed on it the more significant digits with the significance decreasing outwardly from the shaft. Four digits, represented by eight concentric rows of slots, are inscribed on this wheel in accordance with the relation mentioned above. The four least significant digits are inscribed on the smaller, faster wheel. The outermost slot defines the least significant digit as a simple On-Off function.

The locations of the defining slits relative to the two wheels are indicated by the dotted lines; associated optical apparatus is not shown but may be similar to that described above. The electrical connections may, for example, be the same as illustrated by Fig. 10.

An 8-digit code can recognize $2^8=256$ angular positions so that a quantum step on an angular basis on the slow wheel will be approximately 1⅖ degrees. On the faster wheel, however, a quantum step will be 16 times as great, or approximately 22½ degrees. A tolerance advantage equal to the speed ratios of the wheels will therefore be obtained by placing the least significant digits on a separate wheel rotating at the higher speed.

The following distinction should be kept in mind. The tolerance advantage just mentioned is purely one of angular tolerance. Merely dividing the conventional or reflected binary code between two wheels as just described would obtain no relaxation of tolerance requirements on a quantum step basis. The more significant digits would still have to be read and resolved with the plus-or-minus one-quarter quantum step accuracy described to obtain the desired resolution. Therefore, noting that the gearing between the two wheels will have to be highly accurate and that accurate relative alignment of the two defining slits would have to be maintained, it may be stated that substantially nothing would be gained by dividing the customary codes between two wheels, one of which rotates faster than the other.

The use of redundant information in accordance with the invention, however, does permit a substantial relaxation of tolerance requirements by the use of two wheels. Further, since the tolerances increase as the digit significance increases, the relative alignment of the defining slits and the gearing between the two wheels need not be maintained with the same high degree of accuracy, as would be required if the normal codes were employed. In the illustrative embodiment, the two least significant digits, $n=0$ and $n=1$, if placed on the slower wheel, would have to be resolved with an accuracy of plus-or-minus ¼ quantum step using Formula 1 above. This would require maintaining tolerances within approximately plus-or-minus ⅜ of a degree. By placing these digits on a wheel rotating 16 times as fast, however, the angular tolerances for these digits will be plus-or-minus 9⅗ degrees. Still employing Formula 1 above, the tolerances on the next digit, $n=2$, which represent the outermost slots on the larger wheel, would be 4⅕ degrees, etc. The order of resolution remains the same, that is, the least significant digit is resolved first and the remaining digits are resolved in order of increasing significance. It is repeated that if the conventional or reflected binary codes without the redundant information were employed, these tolerance requirements on the larger wheel, assuming an 8-digit code, would remain at plus-or-minus ¼ quantum step or plus-or-minus ⅜ of a degree.

Another feature of the invention is that the more significant digits can be read by relatively simple means without refined optical equipment such as is necessary where tolerances are small. Many of the lesser significant digits can also be read by simple means where the code is divided on two wheels.

Although the invention has been described in relation to specific embodiments employing specific codes, it should be noted that these are merely illustrative. Other embodiments which may, for example, employ different codes, will readily occur to one skilled in the art and are, therefore, within the scope of the invention.

What is claimed is:

1. A system for translating information of a continuously variable nature into digital information in accordance with an $n$ digit conventional binary code comprising a code wheel rigidly mounted on a shaft, means for rotating said shaft in accordance with said continuously variable information, means for representing the least significant of said digits comprising $$\frac{2^n}{2}$$

windows evenly spaced about a first circle on said wheel centered on said shaft, means for representing each of the remaining digits comprising $[2^{n-n'}]$ windows evenly divided and spaced about a pair of adjacent concentric circles centered on said shaft, where $n$ is the total number of digits in the code and $n'$ is the order of significance of a particular digit commencing with $n'=0$ for the least significant digit, the windows in said adjacent concentric circles being offset radially with respect to each other, means for illuminating a radius of reference along said wheel, light-responsive means located on the opposite side of said wheel and positioned to respond to the light which shines through the window along said radius of reference, means for translating said light responses into electrical On-Off pulses, and means for resolving the $n$ digits comprising the binary number representative of the angular position of said shaft.

2. The combination in accordance with claim 1 wherein said resolving means comprise means for resolving each of said $n$ digits in order of increasing significance, said last-named means for all digits other than the least significant digit comprising means for comparing the binary character of the On-Off pulses of the pair which represent the digit to be resolved with the previously resolved digit of next lower significance.

3. In a system for translating information of a continuously variable nature into digital information in accordance with an $n$ digit conventional binary code where $n$ is an integer, said system comprising a generally opaque code wheel rigidly mounted on a shaft, said code wheel having a plurality of transparent windows representing said binary code located on concentric circles on said wheel, means for rotating said shaft in accordance with said information of a continuously variable nature, a source of light positioned to illuminate a radius of said wheel, means for reading the angular position of said shaft comprising light-responsive means located along said radius on the side of said wheel opposite said source, and means for translating the responses of said light-responsive means into $n$ On-Off pulses, the combination wherein said windows are located on $(2n-1)$ concentric circles, the first of said circles having $$\frac{2^n}{2}$$

windows evenly spaced about said first circle, the windows on said first circle representing the least significant of said $n$ digits, the windows on the remaining circles in pairs of adjacent circles each representing one of said $n$ digits other than said least significant digit, the circles of each pair each having $$\frac{2^{n-n'}}{2}$$

evenly spaced windows of substantially equal length which are offset radially with respect to each other, where $n$ is the number of digits in the code and $n'$ is the order of significance of a particular digit commencing with $n'=0$ for the least significant digit.

4. In apparatus for translating information of a continuously variable nature into digital form comprising a generally opaque coding plate having evenly spaced rows of transparent windows which define the permutations of a binary code as On-Off functions, a scanning source positioned on one side of said plate and adapted to scan a narrow segment on said plate perpendicular to said rows, means responsive to said scanning means positioned on the other side of said plate and adapted to be energized by energy from said scanning source which passes through the windows which intersect said narrow segment, means for producing bivalued pulses in accordance with the responses of said scanning responsive means and means for varying the segment of said plate scanned by said scanning means in accordance with said information of continuously variable nature, the combination wherein said coding plate has a first row of windows defining the least significant digit of said code as a direct On-Off function and a plurality of pairs of rows, one pair for each of the remaining digits of said code, representing said remaining digits, the windows of said pairs of rows being roughly equal in length to an On function, as defined on said plate, of the digit they represent, and the windows of each of said pairs being offset with respect to each other and positioned to define the On-Off character of the digit they represent in a logical relation with the On-Off character of the digit of next lower significance.

5. The combination in accordance with claim 4 and logical electronic circuits having inputs and outputs, and means for applying said bivalued pulses to said logical circuits, said logical circuits simulating electronically the logical relation of the digits of said code other than the least significant digit.

6. The combination in accordance with claim 4 and means for resolving each of said $n$ digits other than the least significant digit comprising an And gate having two inputs and an output and adapted to deliver a pulse representative of said first value if and only if both inputs comprise pulses representing said first value and a But Not gate having two inputs and an output adapted to deliver a pulse representative of said first value if and only if a pulse of said first value is applied to a first of said last-named inputs but not if a pulse representative of said first value is simultaneously applied to the other of said last-named inputs, means for applying the pulses representing the digit of next lower significance than the digit to be resolved to an input of said And gate and to said second input of said But Not gate, means for applying a pulse produced in response to the scanning of one of said rows of windows of the pair of rows representing the digit to be resolved to the other input of said And gate, means for applying the pulse produced in response to the scanning of the other of said rows of windows of said pair of rows representing the digit to be resolved to said first input of said But Not gate, and means for combining the outputs of said And and said But Not gates.

7. Apparatus for defining a varying quantity in terms of a binary code comprising means for sampling said quantity, means for measuring each of said samples in terms of a unit bivalued function which varies from one value to the other at successive quantum step boundaries and also in terms of pairs of bivalued functions, the functions of each pair being a submultiple of said unit function and related thereto by integral powers of two commencing with a power of one for the first of said pairs, means for determining the binary character of the least significant digit from the measured value of said unit quantity and means for resolving digits of successively higher orders of significance comprising means for comparing the binary character of the measured values of each successive pair of functions with the binary character of the next previously resolved digit, and binary pulse producing means responsive to said comparison.

8. Apparatus for translating a varying quantity into code groups of bivalued digital pulses comprising a shaft, means for rotating said shaft in accordance with said varying quantity, a first code wheel geared to said shaft in a one-to-one ratio, said first wheel having inscribed thereon a first plurality of light transmissive-windows spaced on pairs of concentric rows, the windows of each pair defining a digit of said code by a logical relation with a resolved digit of said code, a second wheel geared to said shaft by a ratio which is an even integral power of two, a second plurality of light-transmissive windows spaced on pairs of concentric rows on said second wheel, the windows on said second wheel defining digits of lower significance than the digits defined by said first wheel but in a similar manner, a third plurality of light-transmissive windows representing the least significant digit of said code spaced about a single row on said second wheel concentric with the other circular rows of windows thereon, means for illuminating radii of reference on said wheels, means for reading the information represented by the light transmitted by the windows illuminated along said radii, and means for resolving the said bivalued digital pulses from said information.

9. A combination in accordance with claim 8 wherein said first wheel bears the representations of the $m$ most significant digits of said code, where $m$ is the said power of two which represents the gear ratio between said second wheel and said shaft.

10. In a digital encoder for encoding information in an $n$-digit binary code, the combination of means for translating said information into groups of $(2n-1)$ binary digits, one of which represents the least significant digit of said code, and means for resolving from said groups of $(2n-1)$ digits groups of $n$ digits, each representative of said information in accordance with said code, comprising means for producing the logical negative of each of said digits other than said least significant digit, a binary digit register having a "set 1 input," "set 0 input" and "reset input," 1 and 0 being the binary representations of said binary digits, a plurality of coincidence gates each having a pair of inputs, means for registering the least significant digit in said register, means for successively applying the remainder of said $(2n-1)$ digits, by pairs, together with their associated logical negatives to the said coincidence gates as inputs and means for applying the outputs of said coincidence gates to the said inputs of said register.

11. The combination in accordance with claim 10 and means for reading the said groups of digits in accordance with said code out of said register.

12. An analog to digital translator comprising means for obtaining samples of input information which is of an analog nature, means for deriving a code group of binary digits which represent the magnitude of each of said samples in accordance with a binary code comprising means for deriving a first digit, means for deriving a pair of digits which represent approximations of the digit of next higher significance and means responsive to the binary character of said first digit for selecting one of the digits of said pair as the said binary digit of next higher significance.

13. Means for encoding information in an $n$-digit binary code which comprises means for reading the binary character of the least significant digit, means for each of the remaining digits for reading the binary character of a pair of related digit functions which together with the resolved digit of next lower significance define one of said remaining digits in accordance with a logical definition and means for resolving each of said remaining digits in order of increasing significance comprising means for comparing the binary character of the digits of each pair with the digit of next lower significance in accordance with said logical definition.

References Cited in the file of this patent

UNITED STATES PATENTS

| | | |
|---|---|---|
| 2,318,591 | Conffigual | May 11, 1943 |
| 2,442,910 | Thomson | June 8, 1948 |
| 2,533,242 | Gridley | Dec. 12, 1950 |
| 2,537,427 | Leid | Jan. 9, 1951 |
| 2,616,965 | Hoeppner | Nov. 4, 1952 |
| 2,630,562 | Johnson | Mar. 3, 1953 |
| 2,634,052 | Bloch | Apr. 7, 1953 |
| 2,679,644 | Lippel et al. | May 25, 1954 |
| 2,685,054 | Brenner et al. | July 27, 1954 |